Feb. 25, 1964 R. VAN ANTWERP 3,122,372

TURNTABLE FOR RECORD PLAYER

Filed March 6, 1961 5 Sheets-Sheet 1

INVENTOR.

Robert Van Antwerp,

BY Brown Jackson Boettcher & Dienner

Atty's.

Feb. 25, 1964 R. VAN ANTWERP 3,122,372

TURNTABLE FOR RECORD PLAYER

Filed March 6, 1961 5 Sheets-Sheet 2

INVENTOR.
Robert Van Antwerp,
BY Brown, Jackson, Boettcher & Dienner
Atty's.

Feb. 25, 1964 R. VAN ANTWERP 3,122,372

TUPNTABLE FOR RECORD PLAYER

Filed March 6, 1961 5 Sheets-Sheet 3

INVENTOR.
Robert Van Antwerp,
BY Brown Jackson Boettcher & Dienner
Atty's.

Feb. 25, 1964 R. VAN ANTWERP 3,122,372

TURNTABLE FOR RECORD PLAYER

Filed March 6, 1961 5 Sheets-Sheet 4

INVENTOR.
Robert Van Antwerp
BY Brown Jackson Boettcher & Dienner
Attys.

Feb. 25, 1964 R. VAN ANTWERP 3,122,372

TURNTABLE FOR RECORD PLAYER

Filed March 6, 1961 5 Sheets-Sheet 5

INVENTOR.
Robert Van Antwerp
BY Brown, Jackson, Boettcher & Dienner
Atty's.

United States Patent Office 3,122,372
Patented Feb. 25, 1964

3,122,372
TURNTABLE FOR RECORD PLAYER

Robert van Antwerp, Benton Harbor, Mich., assignor to V-M Corporation, Benton Harbor, Mich., a corporation of Michigan Filed Mar. 6, 1961, Ser. No. 93,524
2 Claims. (Cl. 274—39)

This invention is directed to a turntable for a record player and more particularly to a turntable of a new and novel configuration.

The recording and reproducing art has progressed from the early types of record discs and reproducing devices utilizing the "hill-and-dale" method or vertical displacement of the tone arm, to an improved system in which lateral displacement of the tone arm is effected as the stylus is driven from side to side in the record groove by deviations of the groove from a constant spiral curve. More recently the advent of stereophonic record equipment utilizing cartridges of extreme sensitivity has served to emphasize the undesired noises produced in conventional record changer arrangements, and it is the elimination of such undesired noises which is a primary object of the present invention.

More specifically, such undesired noises or distortion in certain models results from a combination of factors which may be generally characterized as microphonics and motor rumble. That is, in the mounting of the various components of a sound-reproducing system in many console models, and also in certain table models, the speaker is placed in the same cabinet in which the record changer is mounted. The cabinet normally defines an air cavity or space into which the rear portion of the speaker extends. As the speaker cone is vibrated to produce variations in air pressure externally of the cabinet for reception by the listener as sound intelligence, corresponding air pressure variations are developed at the rear of the speaker within the cavity. Because the record changer has a large number of openings which are required for mounting of the various elements thereon (which openings cannot be practically eliminated), as the air within the cavity is compressed by movement of the speaker, air is forced upwardly through the various mounting holes in the record changer, and the air thus escaping strikes a portion of the record disc which projects over the edge of the turntable.

The cartridge carried by the pickup or tone arm is basically designed to produce an electrical signal related to vibrations of the stylus connected to the cartridge. As the stylus travels in the record groove, undesired vibrations of the record itself, such as those produced in the record disc by reason of the air movements created by speaker displacement, are also translated from the record disc over the stylus to the cartridge. Such vibrations are then amplified and projected over the sound-reproducing system back to the speaker, and this "closed loop" condition results in a self-sustaining microphonic effect which may be of a sufficiently high level to produce a serious disturbance in the output signal from the sound-reproducing system.

Such undesired noise effect is further aggravated by reason of the fact that the natural resonant frequency of the record disc is of the order of 80 cycles per second, and further, the speaker unit has a natural resonance frequency which is in the same general range of values. Because of this close relationship within the frequency spectrum of the natural resonant frequencies of both the speaker and the record disc itself, the undesirable microphonic condition in the closed loop amplification thereof is further increased.

In addition to the foregoing considerations, the undesirable noise condition is further magnified by the fact that the turntable is mounted or affixed to the cabinet which houses the various components, and normally rests on mounting springs attached to such cabinet. As a result the speaker vibrations are picked up by the cabinet and transmitted physically, rather than by air conduction, through the mounting springs to the record changer and the turntable thereof, ultimately transmitting such vibrations through the record disc to the cartridge and thus further increasing the disturbance.

Further it has been noted that the motor rumble in record changers may have a characteristic frequency in the order of 60 cycles per second, which is in the general range of the natural resonant frequencies both of the record disc and of the speaker unit, thus tending to augment vibration of the record near its resonant frequency and thereby produce further disturbances.

One possible solution to such problem which received immediate consideration was the production of an eleven-inch turntable having a peripheral flange structure disposed for engagement with the idler wheel of the drive mechanism of the record player. However, such approach to the problem was quickly discarded in that it could not be used with record players which were already in the field, and a large number of people would be deprived of the advantage of the larger turntable structure. Further, the manufacturing of the new model record player including an eleven-inch turntable with a conventional flange located at the rim for engagement by the idler wheel would necessitate relocation of the turntable drive motor and the associated linkage which connects the speed-selector knob and the drive motor assembly, and the complexity and the re-tooling expenses necessitated by the production of an eleven-inch turntable with a conventional rim drive did not appear to be warranted. As a result, some method was sought to secure the advantages inherent in the use of a larger turntable without requiring the discard of existing record players by the users and without requiring a substantial capital expenditure for re-tooling by the manufacturer.

It is accordingly a primary object of the present invention to produce a turntable of a diameter sufficiently large to prevent air from blowing past the edge and raising a twelve-inch record, which turntable is suitable for use with existing record player layouts and mechanisms.

It is another object of the invention to produce a turntable approximately eleven inches in diameter without the necessity of relocating or modifying the major components located below the baseplate of the record player mechanism.

A turntable formed in accordance with the inventive teaching includes a central area disposed in a reference plane, an outer rim area positioned in substantially the same plane, and an annular flange-like projection, extending at substantially right angles to the reference plane and located between the central and rim areas. The central area, the flange-like projection, and the rim area can be formed from a single sheet of stock, thereby providing an integral or unitary turntable. "Unitary," as used herein refers to a turntable provided from a single sheet of metal without the affixing of extraneous elements by welding or other joining operations. With the novel construction of the invention, the downwardly extending flange projection under the turntable provides a surface for engagement with the idler wheel of the drive means, the flange-like projection being in approximately the same position on an eleven-inch turntable as the downturned flange member at the edge of a conventional nine-inch turntable. Accordingly the novel construction obviates the difficulties experienced with twelve-inch records played on nine-inch turntables when the tone arm has a high vertical sensitivity, as described above, without necessitating any modification of the drive means or associated linkage.

The novel turntable may be formed in a single stamping operation, with various steps being performed in sequence as the ram member is displaced relative to the bed of the die assembly. Because a single operation is utilized and the blank is firmly held during the formation of the turntable, there is no release and consequent distortion of the metal. By examining the various positions of the die members in the single stamping operation, the separate steps of shearing the blank from the metal stock, embossing a central area thereon, drawing a well in the blank, reverse drawing to provide the annular flange-like extension spaced from the edge of the turntable, stamping of radial ribs near the center both for strengthening the turntable and to prevent the occurrence of excess metal and deformation of the central area, and the provision of the required holes by punch actuators as the ram bottoms out against the bed, will be made clear in the sequence of operations related subsequent to the description of the inventive structure.

The features of the present invention which are believed to be novel are set forth with particularity in the appended claims. The invention itself, together with further objects and advantages thereof, may best be understood by reference to the following description taken in connection with the accompanying drawings, in the several figures of which like reference numerals identify like elements, and in which:

FIGURE 4 is a front sectional view depicting various elements of the die assembly shown generally in FIGURE 3;

*Novel Turntable Configuration*

Figures 1, 2:
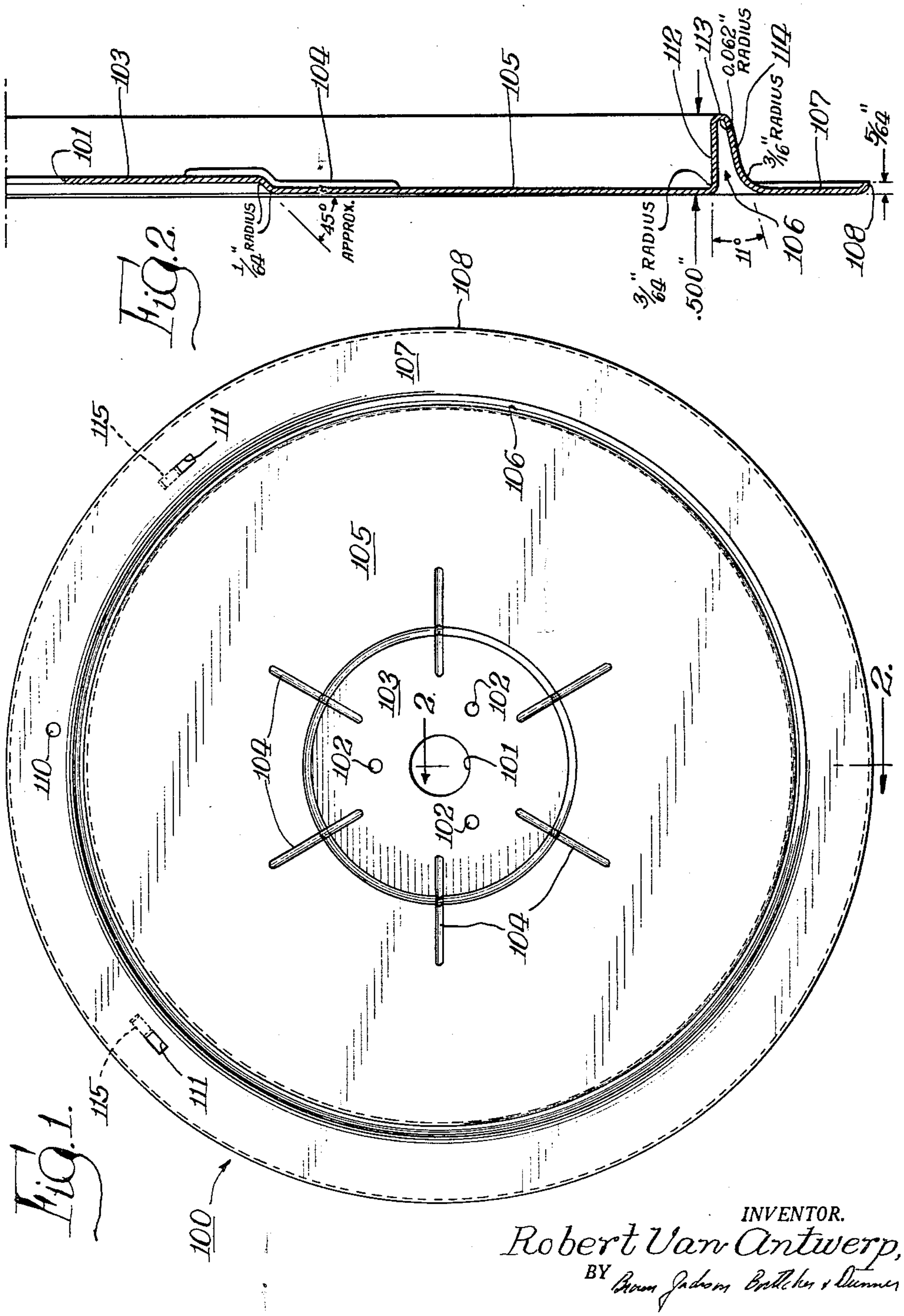
FIGURE 1 is a top view of a new and novel turntable formed in accordance with the inventive teaching.
FIGURE 2 is an enlarged fragmentary sectional view, taken along the line 2—2 in FIGURE 1, particularly illustrating the configuration of the flange-like projection of the novel turntable.

FIGURES 1 and 2 depict a turntable formed in accordance with the inventive teaching to prevent the blowing of air past the turntable rim and displacement of twelve-inch records, which turntable nevertheless is suitable for use with existing record playing mechanisms. As shown in FIGURE 1 (looking downwardly toward the top of a finished turntable) turnable 100 includes a central aperture 101 for receiving the spindle bushing when the turntable hub (not shown) is affixed below the central portion of turntable 100, three apertures 102 for receiving fastening studs which join the hub to the turntable, a depressed central area 103 in which apertures 101 and 102 are formed (area 103 is formed by an embossing step as will be explained hereinafter), six radial ribs 104 equally spaced about the turntable center and extending from the depressed central area 103 into the main record-supporting area 105, an annular flange-like projection 106 (better seen in FIGURE 2), an outer rim area 107, and a flange or small lip 108 at the periphery of the turntable. The radial ribs 104 not only provide strength for the central portion of the turntable, but also use up any excess metal which might otherwise deform the central area during the shaping of the turntable.

Although the lower central area 103 is not in precisely the same plane as is record-supporting area 105, in certain of the appended claims both areas 103 and 105 will be considered as a single central area lying in the same reference plane, with outer rim area 107 disposed in the same plane; it is the extension of flange-like projection 106 at substantially right angles to this reference plane which permits the incorporation of the new and unobvious turntable into existing record player layouts and mechanisms without the necessity of expensive retooling and production changes. The outer rim area 107 includes an annular opening 110 and a pair of rectangular apertures 111, each of apertures 111 being formed by striking down and bending back a tongue portion 115. Rim area 107 provides support for the outer portion of any record having a diameter exceeding the diameter of flange-like projection 106.

The configurations of embossed central area 103 and flange-like projection 106 are better depicted in the sectional showing of FIGURE 2. As there shown, flange-like projection 106 includes a first wall 112 extending at substantially right angles to the plane of record-supporting area 105, a rolled-over edge 113, and a second wall 114 extending from the rolled-over edge to outer rim area 107. It is noted that wall 114 extends at an obtuse angle with respect to the plane of the turntable areas 105 and 107. It is further emphasized that the entire turntable, including projection 106 with rolled-over edge 113, is formed from a single piece of stock without any breaking or cracking of the stock during the fabrication thereof. The difficulty of shaping the stock into the finished turntable of novel configuration is better appreciated when it is remembered that the various bends and contours illustrated in FIGURE 2 are formed in a sheet of stock only 0.036 inch thick in a single stamping operation. By providing flange-like projection 106 at a location spaced from the edge of the turntable, the turntable can be made eleven inches in diameter, thus precluding the passage of air past the edge thereof to lift twelve-inch records, and nevertheless the idler wheel can still be positioned in the same location as with nine-inch turntables, to engage inner wall 112 of the flange-like projection in substantially the same location as the down-turned outside flange of a nine-inch turntable. The use of a drive wheel for engaging a downwardly depending flange on a turntable to drive the same is conventional in the art and thus will not be specifically described herein. For example, Gee Patent 2,556,421 shows such a turntable drive, and also shows a phonograph housing including a speaker, a pick-up and a turntable. Those skilled in the art will appreciate the considerable savings attendant on the production of the larger turntable, to remove the distortion originally noted in the playing of twelve-inch stereo discs on nine-inch turntables, without the necessity of expensive capital expenditures for the design of new record player layouts and re-tooling for the new arrangement.

*Description of Major Turntable Forming Components*

Figures 3, 5A, 5B:
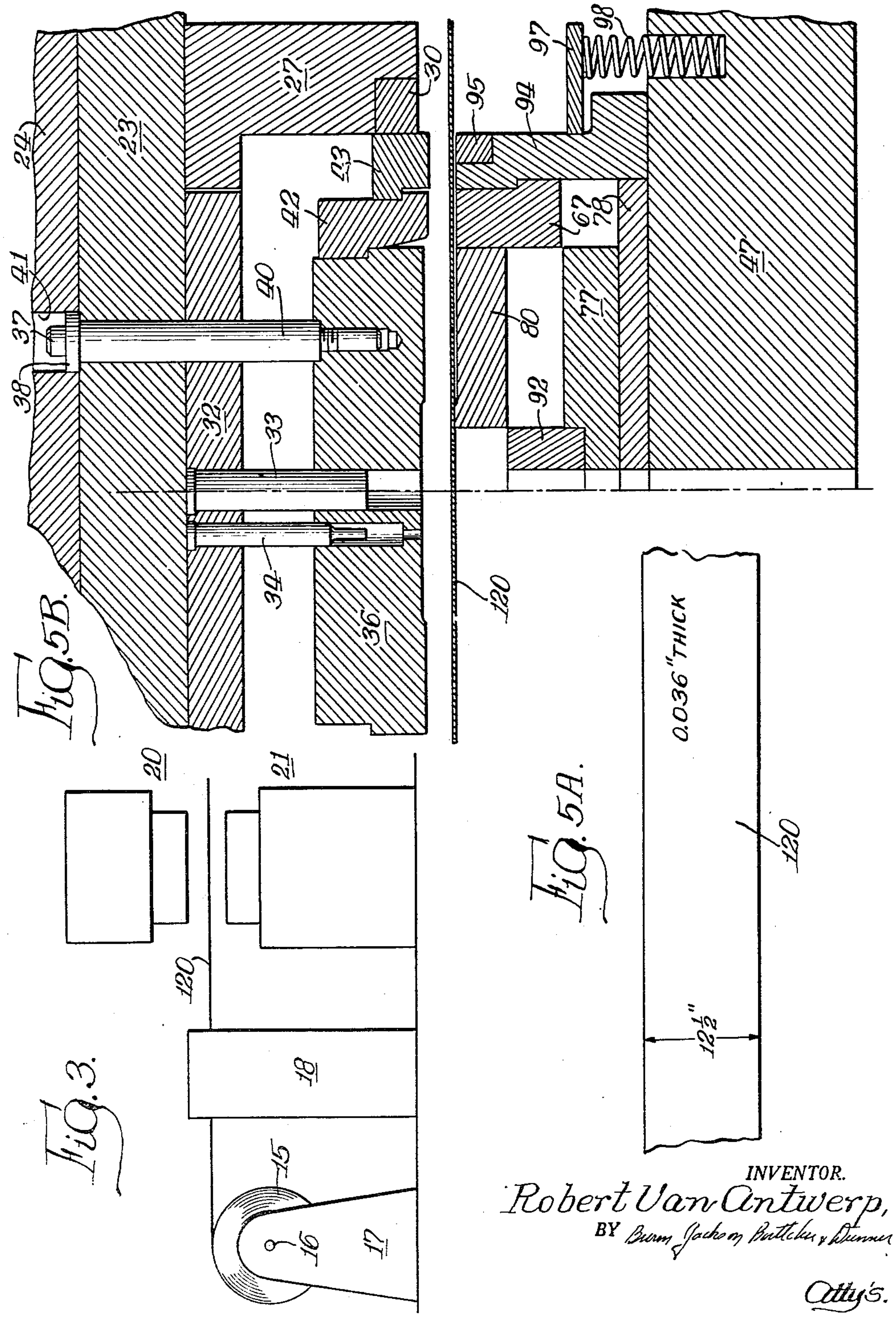
FIGURE 3 is a diagrammatic showing of the basic elements for producing a finished turntable from a roll of stock.
FIGURES 5A, 6A, 7A, 8A, 9A and 10 are perspective illustrations depicting various sequential steps in the single stamping operation as a turntable is shaped from a blank of materials.
FIGURES 5B, 6B, 7B, 8B and 9B are partial sectional views depicting certain of the elements shown in FIGURE 4 and their relative positions as the pieces shown in FIGURES 5A–9A are formed.
Figure 2:
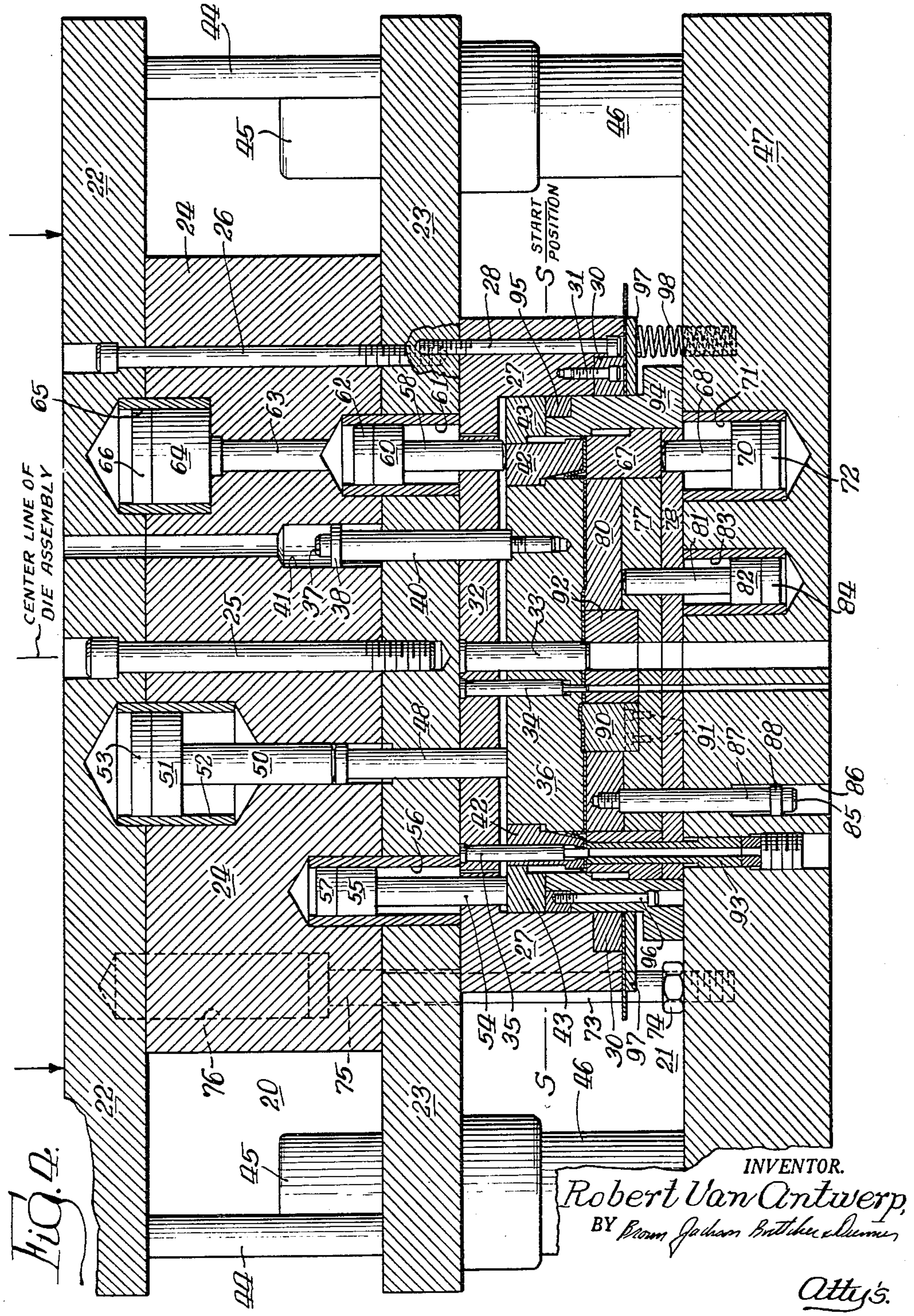

Referring to FIGURE 3, a roll of metal stock 15 is journaled or supported on an axle 16, itself supported by a pair of standards 17, only one of which is visible in this view. The metal stock can be stored in roll form because of the relative thinness of the metal from which the turntable is stamped, the metal stock, in one commercial embodiment, being only 0.036 inch thick. As the stock is unrolled, it is passed through a stretcher and leveler mechanism 18 of a commercial type, in which the material is smoothed and flattened prior to the stamping operation. The material is then introduced between the upper and lower die members 20 and 21, respectively, or the ram and the bed of the die assembly, for the stamping operation.

To emphasize the advantages of such a system as contrasted with the techniques heretofore employed, only one man, the die assembly operator, is required to operate the equipment illustrated in FIGURE 3. Prior to the employment of the inventive teaching it was common practice to manufacture the standard nine-inch turntable unit from flat sheets of stock. Such a procedure therefore required at least a die operator and a stock handler for feeding the material to the die assembly. Moreover, in that the sheets were of varying thickness, and even a minute variation in thickness would affect the size of the turntable flange, it was necessary to use two additional men to check the thickness of each sheet with gauges as the sheets were fed from the stockpile to the die assembly. Therefore it is apparent at the outset that a significant saving in labor and time is realized by practice of the invention.

*Description of Die Structure*

To orient the reader with respect to the subsequent description of the fabrication of the novel turntable, the components of the ram and bed assemblies will first be described. Initially it is noted that the die assembly has a "start" position as indicated in FIGURES 3 and 5B in which the ram and bed assemblies are spaced apart to receive the sheet of stock therebetween, and an end of "bottomed" position as depicted in FIGURE 4 illustrating the die equipment after the turntable forming step has been completed. Reference line S in FIGURE 4 indicates the level at which the flat stock is initially positioned when the ram and bed assemblies are spaced apart as indicated in FIGURES 3 and 5B to admit the stock, and the heavy dark line indicates the form of the turntable produced with the displacement of the ram to the position of FIGURE 4.

The machine basically comprises a ram having a die shoe assembly including both fixed and movable punch elements which cooperate with die pads supported on the bed to produce the turntable of the novel configuration according to the inventive teaching. From the description of the circular turntable given above and the illustration thereof in FIGURES 1 and 2, it is apparent that the punch and die pad elements shown in FIGURE 4 generally comprise a plurality of concentric circular members. As a result the shapes of such members are readily apparent from the sectional view of FIGURE 4, the perspective illustrations (FIGURES 5A–10) which show the effect of these members upon the flat blank, and the plan view of the article in FIGURE 1.

As shown in FIGURE 4, ram 20 includes a die shoe assembly comprising an upper plate 22, a lower plate 23, and a central member 24 affixed therebetween. This main body of the die shoe assembly is secured in part by screw 25 disposed centrally in the assembly, extending from a counter-bored section in plate 22 downwardly through central member 24, and having a threaded extremity received in a correspondingly tapped portion of lower plate 23. In addition, eight screws 26 (only one of which is shown in FIGURE 4) are disposed radially from the center line of the die assembly (concentric with the axis of screw 25), and screws 26 likewise extend through the assembly and are received in tapped sections of lower plate 23. The outer portions of upper plate 22 and lower plate 23 are spaced apart by a plurality of bars 44.

An annular ring-supporting member 27 (FIGS. 4 and 5B) is affixed to the lower surface of plates 23 by a plurality of screws 28, only one of which is shown in the drawing, each of the screws 28 extending from a counter-bored section in annular member 27 to a correspondingly tapped portion in plate 23. A cutting ring or shear element 30 is secured by a plurality of fastening screws 31, only one of which is illustrated, in a cut-out shoulder portion of ring-supported member 27 as illustrated.

A disc-like element 32 is affixed to the lower surface of plate 23 by fastening screws not illustrated in the drawing. Disc 32 is suitably bored and counter-bored to receive the head portions of a plurality of perforators or punch elements 33, 34 and 35. Perforator 33 is centrally disposed to punch out the central aperture 101 (FIGURE 1) at the turntable center. There are three perforators 34 (only one of which is shown in the sectional view) which are spaced at 120° intervals to form the apertures 102 in the central embossed area of the finished turntable at the relative positions shown in FIGURE 1. Two rectangular-head perforators 35 are located to form apertures 111 at the relative positions shown in FIGURE 1, and a third perforator 35 has an annular head to produce the circular opening 110 at the relative position shown in the rim area of the finished turntable.

Elements 27, 30, 32, 33, 34, and 35 described above are considered as the fixed punch elements of the die shoe assembly of the ram 20. That is, the relative positions of the fixed punch elements and the die shoe assembly remain unchanged through the stamping operation. The ram assembly also includes movable punch elements, that is, elements which are movable to the position indicated in FIGURE 5B with respect to the die shoe assembly prior to the formation of a turntable member, and which are operable to the position shown in FIGURE 4 during a stamping operation.

Specifically, the movable elements include a set of concentric annular members 36, 42 and 43. Movable circular punch member 36 is positioned below the die shoe assembly as shown, and the limit of relative displacement between the movable punch element and the die shoe assembly is fixed by a plurality of screws 37, only one of which is shown in the drawings. Each screw 37 includes a washer head 38 and a sleeve or bushing 40 positioned in corresponding bores in lower plate 23 of the die shoe assembly and in fixed punch member 32. The threaded end of each screw 37 is received in a correspondingly tapped portion of movable punch 36, and washer head 38 is sized for displacement in bore 41 in central member 24 of the die shoe assembly. Accordingly, the extent of displacement of movable punch element 36 relative to the die shoe assembly is limited to the distance between washer head 38 and the upper surface of lower plate 23.

Movable punch member 36 is formed with a shoulder on its outer periphery which cooperates with a shoulder on annular punch member 42 which is positioned to encircle punch 36 as best shown in FIGURE 5B. As there shown, an upper shoulder portion on the inner periphery of member 42 engages the shoulder on the lower end of punch 36 as shown, and the lower portion of annular punch member 42 is angled outward from the shoulder on member 36. A second shoulder is formed on the outer periphery of annular punch member 42 and an upper shoulder portion on annular holding ring 43 engages the outer shouldered portion of annular punch member 42 as shown in FIGURE 5B. As will be made clear hereinafter, the shoulder portions of punches 36 and 42 and ring 43 are positioned to limit the relative displacement between these members.

Movable punch 36 is subjected to forces applied over four piston-and-cylinder assemblies, only one of which is illustrated. Such assembly includes a piston 51 received in a cylinder 52, defining a chamber 53 above the piston; force is transmitted from a fluid under pressure in chamber 53 over piston 51, piston rod 50 and drill rod 48 to movable punch 36. In similar fashion a force is applied to the upper surface of movable punch 42 over four piston-and-cylinder arrangements such as illustrated piston 60 with rod 58, and also over four additional assemblies, such as illustrated piston 64 and drill rod 63. A force is applied to holding ring 43 by eight piston-and-cylinder assemblies, such as illustrated piston and rod members 54, 55. The application of such forces during the stamping operation will be described in more detail hereinafter.

The lower portion of the punch equipment which cooperates with the ram 20 comprises a bed 21 including a base 47, and a plurality of cylindrical guide elements 46 supported thereon are dimensioned to receive corresponding cylindrical guide elements 45 affixed to ram assembly 20.

A disc member 78 is positioned on base 47, and another disc member 77, of a diameter smaller than that of disc 78, is positioned above disc 78. Each of discs 77 and 78 is fastened in the position shown, connected rigidly to base 47 of the bed, by a plurality of fastening screws not indicated in the drawing.

An annular ring-supporting member 94 is fastened to base 47 by a plurality of fastening screws not depicted in the drawing. A shoulder formed in the uppermost outer portion of member 94 receives an annular shear ring 95, affixed therein by a plurality of screws 96, one of which is shown. An annular scrap-collecting member 97 is positioned to encircle ring-supporting member 94, and a plurality of springs 98, one of which is illustrated, are positioned in suitable recesses in base 47 to resiliently support scrap-collecting ring 97.

Main die pad 80 is generally annular in configuration, and is supported above disc 77 for movement relative to the disc 77 and to base 47. Die pad 80 includes a raised center portion which cooperates with a correspondingly shaped recess in movable punch 36 of the ram in the formation of the depressed central area 103 (FIG. 1) of the finished turntable; it is noted that FIGURE 1 is a top view of the completed turntable, while in the sectional showing of FIGURE 4 the turntable (heavy line) is inverted with respect to its normal position. A bar 92 is positioned in the central portion of die pad 80, and a bore is provided in bar 92 to permit the passage of perforator 33 therethrough, together with the material from the turntable blank, when the central aperture 101 is provided in the finished turntable. Six rib-forming pieces 90 are provided at 60° intervals in corresponding slots of die pad 80, positioned to form ribs 104 illustrated in FIGURE 1. Each piece 90 (FIGURE 4) is fastened by a plurality of fastening screws 91 to disc 77. Bar 92 also includes three bores, only one of which is shown, for receiving the material punched out by perforators 34 to provide apertures 102 in the central or embossed area of the finished turntable.

As shown in FIGURE 5B, die pad 80 is displaceable upwardly with respect to base 47 from the position shown in FIGURE 4 under the urging of force applied from fluid in chamber 84 over six piston and rod members such as illustrated piston-rod members 82, 81 which are disposed circularly around the base of the bed assembly. Displacement of die pad 80 relative to disc 77 and base 47 is limited by a plurality of screws 85 (only one is shown), each having a washer head 88 positioned in the bore 86. The screw extends through a sleeve or bushing 87 and includes a threaded end portion received in a corresponding tapped portion of die pad 80.

An annular die pad 67 is positioned to substantially encircle die pad 80. A shoulder on the outer periphery of die pad 67 is positioned for engagement with the shoulder on the inner periphery of ring-supporting member 94 to limit the displacement of die pad 67 under the urging of forces applied over eight piston assemblies. One such assembly is illustrated, and includes a piston rod 68 connected to a piston 70 within a cylinder 71, to define a chamber 72 for receiving fluid under pressure.

It is noted briefly hereat that the various piston-and-cylinder assemblies are of different diameters, piston 51 having the largest diameter and the sizes being graduated through pistons 64, 70, 60, 55, to the smallest diameter piston, 82. As will be explained more fully in connection with the operating discription hereinafter, the fluid system equalizes the pressure in the chambers of these assemblies at a predetermined value prior to each stamping operation by the press. Thus, as the ram descends, the sizes and the numbers of the piston-and-cylinder assemblies which apply pressure to the different members determine the manner and time of operation of the various elements in the single stamping operation. The effects of the various forces developed by the differently sized pistons, and the different numbers of such pistons, will be made clear in the operating description.

A plurality of bushings 93, only one of which is shown in the drawing, are positioned in base 47, as shown, and extend upwardly through disc 78 and secondary die pad 67, to receive the operating end of each perforator or punch 35 and the scrap produced as the perforator passes through the rim area in the bottoming out or last stage of the turntable fabrication.

An upstanding rod 73 has a lower threaded end received in a nut 74 and a correspondingly tapped portion of base 47. The upper extremity of rod 73 engages a piston 75 shown below chamber 76, to which a fluid line and a bleed valve (not shown) may be connected to stabilize the pressure of the fluid in the system. Piston 75 and chamber 76 permit a pressure equalizing or preboosting operation before the stamping process, to adjust the pressure applied over various fluid lines (not shown) to the chambers defined between the pistons and the extremities of their cylinders or liners.

*Sequence of Operation*

Referring to FIGURE 3, the flat stock is fed from reel 15 through stretcher and leveler 18 between ram 20 and bed 21. In a constructed embodiment turntables were satisfactorily formed from flat stock material 0.036 inch thick and 12½ inches wide, as shown generally in FIGURE 5A. Referring to FIGURE 5B, the ram including the die shoe assembly, fixed punch elements 27, 30 and 32, movable punch members 36 and 42, and holding ring 43, is shown retracted to the upper or start position. The various piston-and-cylinder assemblies, having been shown in detail in FIGURE 4, are omitted from FIGURE 5B and the subsequent illustrations.

In the lower portion of FIGURE 5B, base 47 and fixed elements 77, 78, 92, 94 and 95 are shown in the positions depicted in FIGURE 4. However, in FIGURE 5B die pad 80 is shown displaced upwardly under the urging of the forces applied over pistons 82 and piston rods 81 to the die pad, and in like fashion the forces applied over pistons 70 and piston rods 68 to die pad 67 displace such pad upwardly to the position illustrated. Thus the stock material 120 is supported in the start position on the upper surfaces of die pads 80 and 67, ring-supporting member 94, and shear ring 95, as shown.

Figures 6A, 6B, 7A, 7B:
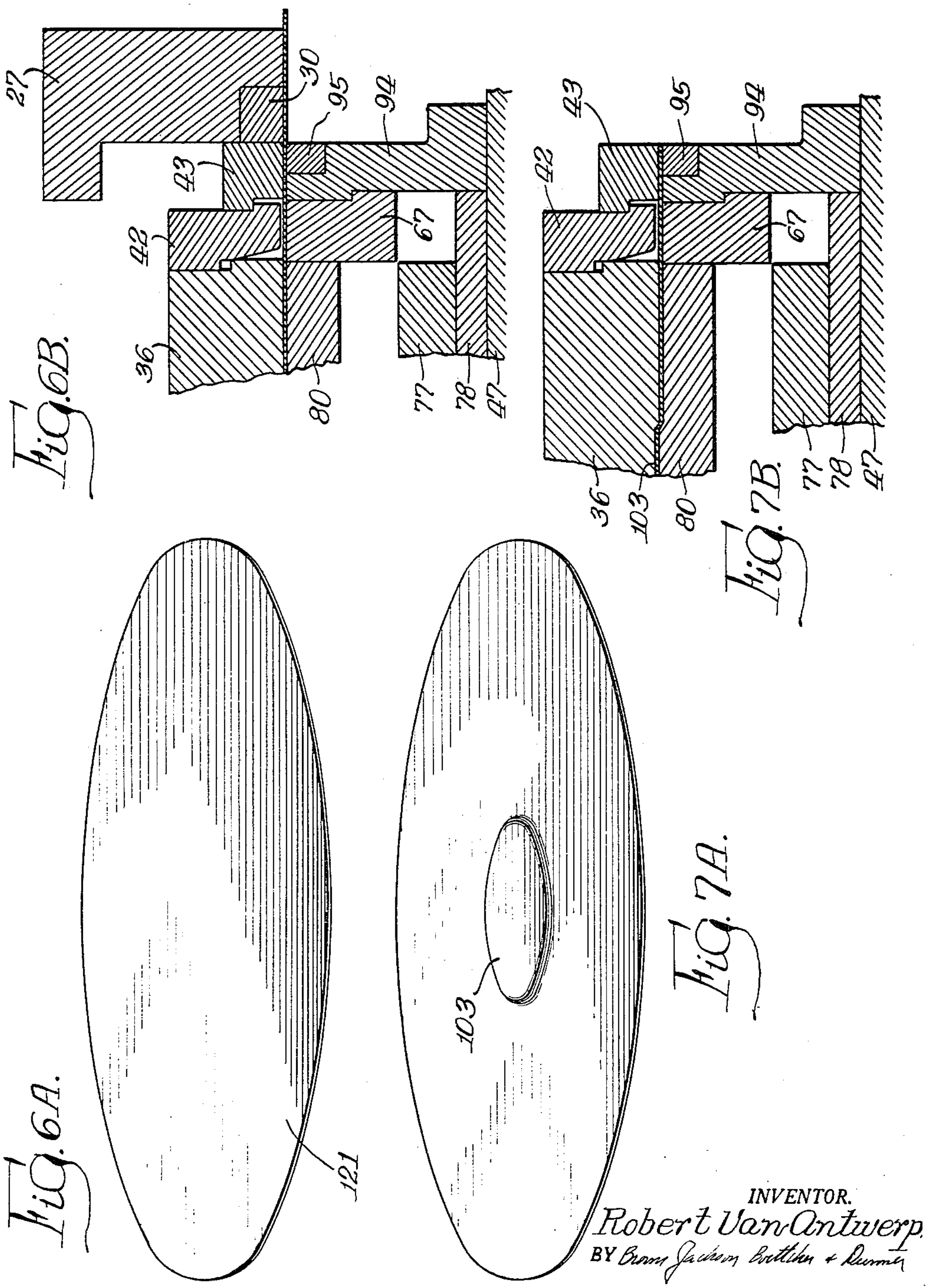

The stamping operation is commenced, the ram being displaced downwardly with respect to the bed to shear from the flat stock 120 (FIGURE 5A) a circular blank 121, as shown in FIGURE 6A. The positions of the cutting elements just prior to the shearing action are illustrated in FIGURE 6B, as the downward movement of the ram displaces cutting ring 30 to pass adjacent cutting ring 95. After the shearing operation, the outer or waste portion of the stock drops downwardly onto scrap-collecting ring 97.

After the circular blank has been provided, continued downward movement of the die shoe assembly forces punch 36 against blank 121 which is supported on main die pad 80. The restraining force from the fluid compressed in chambers 94 (FIG. 4) is not sufficient to maintain the position of die pad 80 as shown in FIGURE 7B against the downward force of the ram, but the restraining force is sufficient to emboss circular portion 103 at the center of the blank as shown in FIGURE 7A.

Referring to FIGURE 7B, the outer edge of the blank is at this time securely gripped between holding ring 43 on the upper side thereof and member 94 and ring 95 on the under side. Because member 94 and ring 95 are fixed to base 47, and holding ring 43 is forced downwardly by the ram movement against the cushioning or retarding force developed as pistons 55 (FIG. 4) compress the fluid in chambers 57, a considerable holding force is thus produced. At this time the total force applied upwardly from chambers 72 over the eight assemblies 68, 70, 71 to die pad 67 exceeds the total opposing force applied downwardly from chambers 62 over the four assemblies 58, 60, 61 to movable punch 42, and movable punch 42 and die pad 67 therefore remain in the positions indicated in FIGURE 7B as the central punch 36 and die pad 80 commence movement toward disc 77. It is observed that at this time drill rods 63 have not as yet engaged punch 42 to augment the downward forces applied to movable punch 42.

In FIGURES 4–10 the turntable is shown inverted with respect to the position it will ultimately occupy in a record player. Thus, the raised circular plateau 103 of FIGURE 7A will become a central annular depression as the blank is inverted.

Figure 8B:
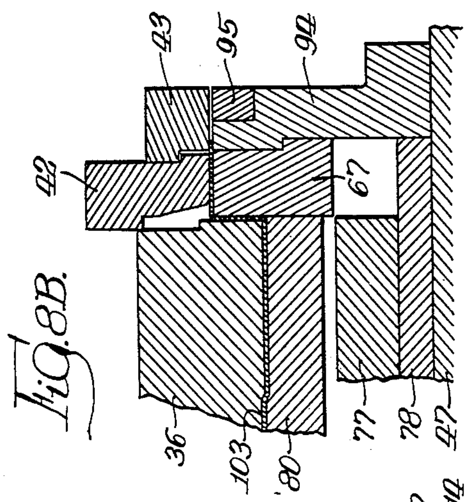
Figure 8A:
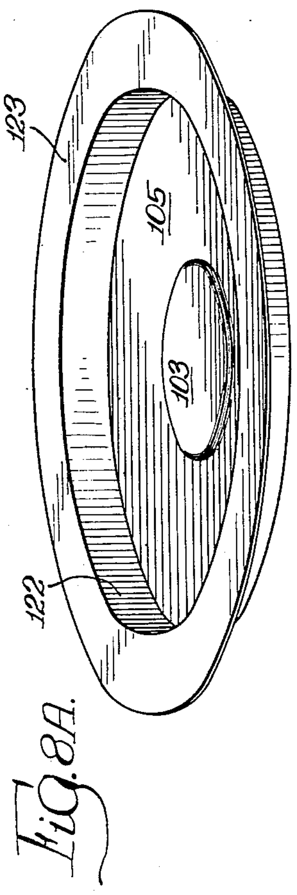
Figure 9A:
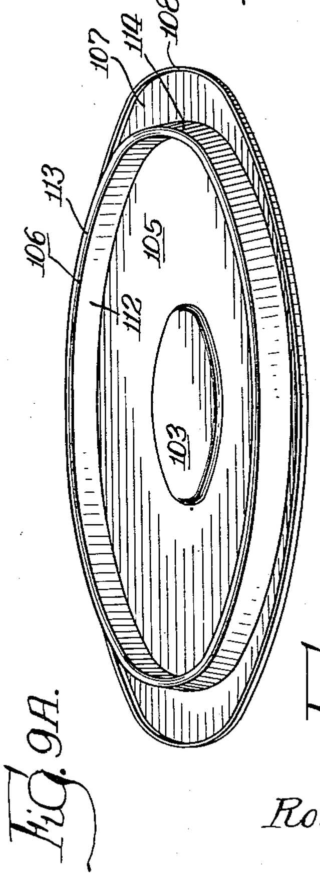

As the ram continues its descent displacing movable punch 36 and main die pad 80 downwardly (and punch 42 and secondary die 67 are restrained as described above and shown in FIGURE 8B), a deep draw of the stamping is effected to provide a well having an annular side wall 122, as shown in FIGURE 8A, and a rim portion 123 which extends from the top of the well to the edge of the blank in a plane substantially parallel to the plane of the bottom surface of the well. The wall 122 thus produced is approximatley twice the height of the flange-like projection to be shaped from wall 122 in the next sequential step of the single stamping operation. Throughout the drawing step the total force applied from the eight pistons 70 over piston rods 68 to die pad 67 exceeds the total force applied to movable punch 42 by the four pistons 60 over piston rods 58.

Figure 9B:
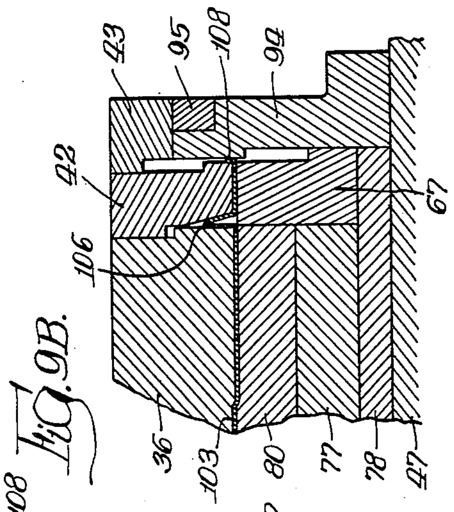

The next step is a reverse drawing operation to produce the annular flange-like projection 106 (FIGURES 1 and 2) for engagement with the idler wheel of the drive assembly. At the end of the drawing step, the drill rods 63 (FIGURE 4) engage the upper surface of movable punch 42 to transmit pressure thereto from the four chambers 66 and pistons 64. The force of such cylinders augments the previously-applied force from cylinders 61 to produce a total downward pressure on punch 42 which is greater than the upward pressure applied from chambers 72 to secondary die pad 67, and punch 42 forces die pad 67 downwardly, as shown in FIGURE 9B.

As there shown, die pad 67 has been displaced by the total force applied to punch 42 to its lowermost position. During such displacement, the upper part of circular well wall 122 (FIGURE 8A) is rolled over or bent back upon itself as punch 42 descends to form a flange-like projection 106 (FIGURE 9A), a washer-like rim area 107, and a lip 108 at the turntable edge.

More specifically, considering the flange-like projection in section as illustrated in FIGURE 2, such projection includes an inner or first wall 112 formed from the lower portion of well wall 122 (FIG. 8A). By "wall" is meant a substantially straight portion extending between different curved portions of the turntable. Wall 112 extends substantially perpendicular to the plane of central area 103, the record-supporting area 105, and rim area 107. A rolled-over edge 113 is formed as the stock material is bent back upon itself in a reverse bend of nearly 180° without cracking or breaking the single piece of stock. As seen in FIGURE 8B, prior to the reverse draw operation, rim portion 123 extends between movable punch 42 and die pad 67, and a small peripheral portion of rim 123 is firmly gripped between holding ring 43 and ring-supporting member 94. The adjacent portions of punch 42 and ring 43 below the mating shoulder portions thereof are spaced apart by a distance slightly larger than the thickness of the metal stock. Accordingly, as movable punch 42 forces the stock and die pad 67 downwardly towards the position shown in FIGURE 9B, the slight extension of the stock into the area between ring 43 and supporting member 94 is pulled out of such area and bent around the lower outermost corner of punch 42 to form lip 108.

There is initially a right angle bend at the juncture of wall 122 and rim portion 123 (FIG. 8A). With the downward movement of punch 42, this right angle is increased to an obtuse angle which approaches 180°. In a commercial embodiment, this angle was formed at 169°, or an angle of 11° between walls 112 and 114. Then, as punch 42 continues downwardly with the stock securely gripped between the punch itself and die pad 67, the material of wall 122 is gradually rolled over, until substantially the entire upper portion of wall 122 (FIG. 8A) has been turned over at the obtuse angle described to form wall 114 (FIG. 9A) of the flange 106. The rolled-over edge 113 connects walls 112 and 114, the edge having been formed from material that was initially positioned approximately in the center of wall 122 in FIGURE 8A. Outer wall 114, that is, the wall nearer the edge of the turntable, extends between rolled-over edge 113 to the rim area 107 at an obtuse angle relative to both the plane of central area 105 and rim area 107. The first or inner wall 112 of flange-like projection 106 is suitable for engagement by an idler wheel in the transfer of power from the driving motor to the finished turntable.

Figure 10:
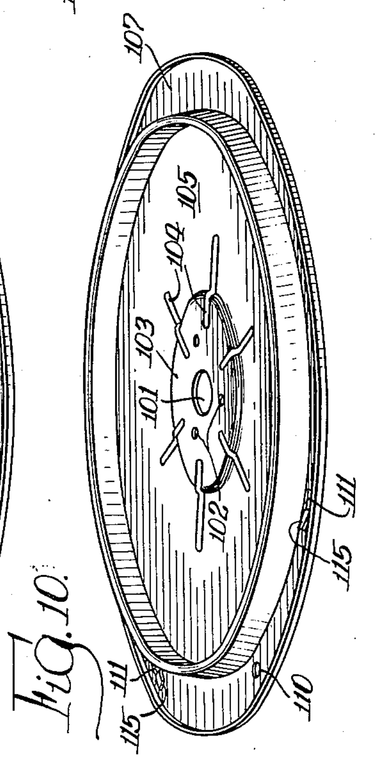

As the ram bottoms out or reaches the last portion of its travel, a plurality of ribs 104 are formed by pieces 90 as shown in FIGURE 10. The radially-disposed ribs not only strengthen the central area of the turntable, but use up any excess metal which might otherwise distort such area into a convex shape. The various perforators 33—35 pierce the formed piece in the bottoming step to produce apertures 110 and 111 as shown. Thus, although the ram has been moved downwardly in one complete and positive stamping operation, the separate steps of shearing the circular blank from the stock, embossing the blank, drawing the well in the blank, effecting the reverse draw operation to provide the flange-like projection spaced from the edge of the turntable, and the production of the ribs and punched holes as the ram assembly bottoms out, are all sequentially performed in one swift process with no release of the metal.

When it is desired to produce an eleven-inch turntable to minimize upward displacement of a twelve-inch record, while maintaining the drive assembly in its previous location below the base plate, the provision of a novel turntable as shown in FIGURES 1, 2 and 10 satisfies these conditions. That is, flange-like projection 106 can be produced about one inch from the edge or lip 108 of the turntable, so that the engagement of the idler wheel against inner wall 112 of the projection is equivalent to the engagement of the idler wheel against the down-turned flange at the edge of a nine-inch turntable produced in conventional fashion. The savings afforded by the invention, even considering only the aspect of obviating the requirement for retooling to re-position the drive assembly, are evident. In addition to such savings, the labor savings are considerable when it is remembered that four men operated prior art turntable stamping systems in which a stock feeder, two stock measuring men, and a die operator were required to do the work now accomplished by the structure of the invention attended by only a single operator.

Although only a particular embodiment of the invention has been shown and described, it is apparent that modifications and alterations may be made therein, and it is intended in the appended claims to cover all such modifications and alterations as may fall within the true spirit and scope of the invention.

What is claimed is:

1. A sheet metal turntable for use with a record player of the type adapted to reproduce 12 inch records and having turntable drive mechanism including a drive wheel adapted to engage an annular flange on a turntable, said turntable comprising a unitary circular sheet of metal having a circular central portion disposed in a horizontal reference plane, a first annular wall extending downwardly out of said reference plane at the periphery of said central portion to form a depending annular flange the radially inner portion of which has a diameter of approximately 9 inches and is substantially perpendicular to said reference plane so as to be engageable by a drive wheel for driving the turntable, a second annular wall extending from the lower end of said first annular wall upwardly along the outside thereof into said horizontal reference plane, and an outer record supporting rim portion extending radially outwardly from the upper end of said second annular wall and disposed in said horizontal reference plane, said outer rim having an outer diameter substantially in excess of 9 inches and less than the diameter of said records so as to provide direct vertical support out to said outer diameter when a 12 inch record is positioned thereon.

2. A sheet metal turntable for use with a record player of the type adapted to reproduce 12 inch records and having turntable drive mechanism including a drive wheel adapted to engage an annular flange on a turntable, said turntable comprising a unitary circular sheet of metal having a circular central portion disposed in a horizontal reference plane, a first annular wall extending downwardly out of said reference plane at the periphery of said central potrion to form a depending annular flange the radially inner portion of which has a diameter of approximately 9 inches and is substantially perpendicular to said reference plane so as to be engageable by a drive wheel for driving the turntable, a second annular wall extending from the lower end of said first annular wall upwardly along the outside of said first wall in diverging relation thereto and into said horizontal reference plane, and an outer record supporting rim portion extending radially outwardly from the upper end of said second annular wall and disposed in said horizontal reference plane, said outer rim having an outer diameter of approximately 11 inches so as to provide direct vertical support out to said 11 inch diameter when a 12 inch record is positioned thereon.

References Cited in the file of this patent

UNITED STATES PATENTS

| | | |
|---|---|---|
| 2,556,421 | Gee | June 12, 1951 |
| 2,980,429 | Thevenaz | Apr. 18, 1961 |
| 3,025,066 | Siebert | Mar. 13, 1962 |